United States Patent Office 3,277,874
Patented Oct. 11, 1966

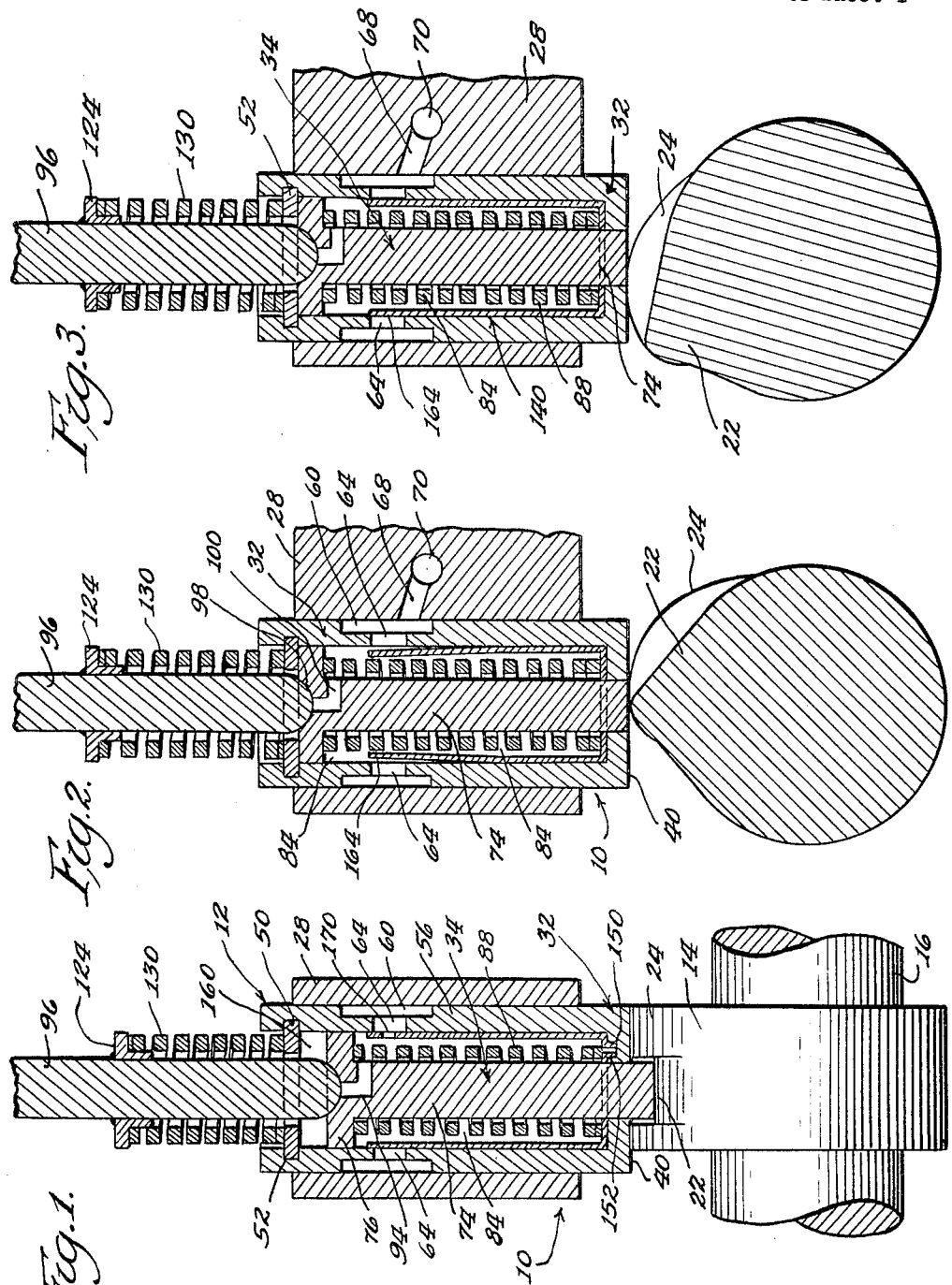

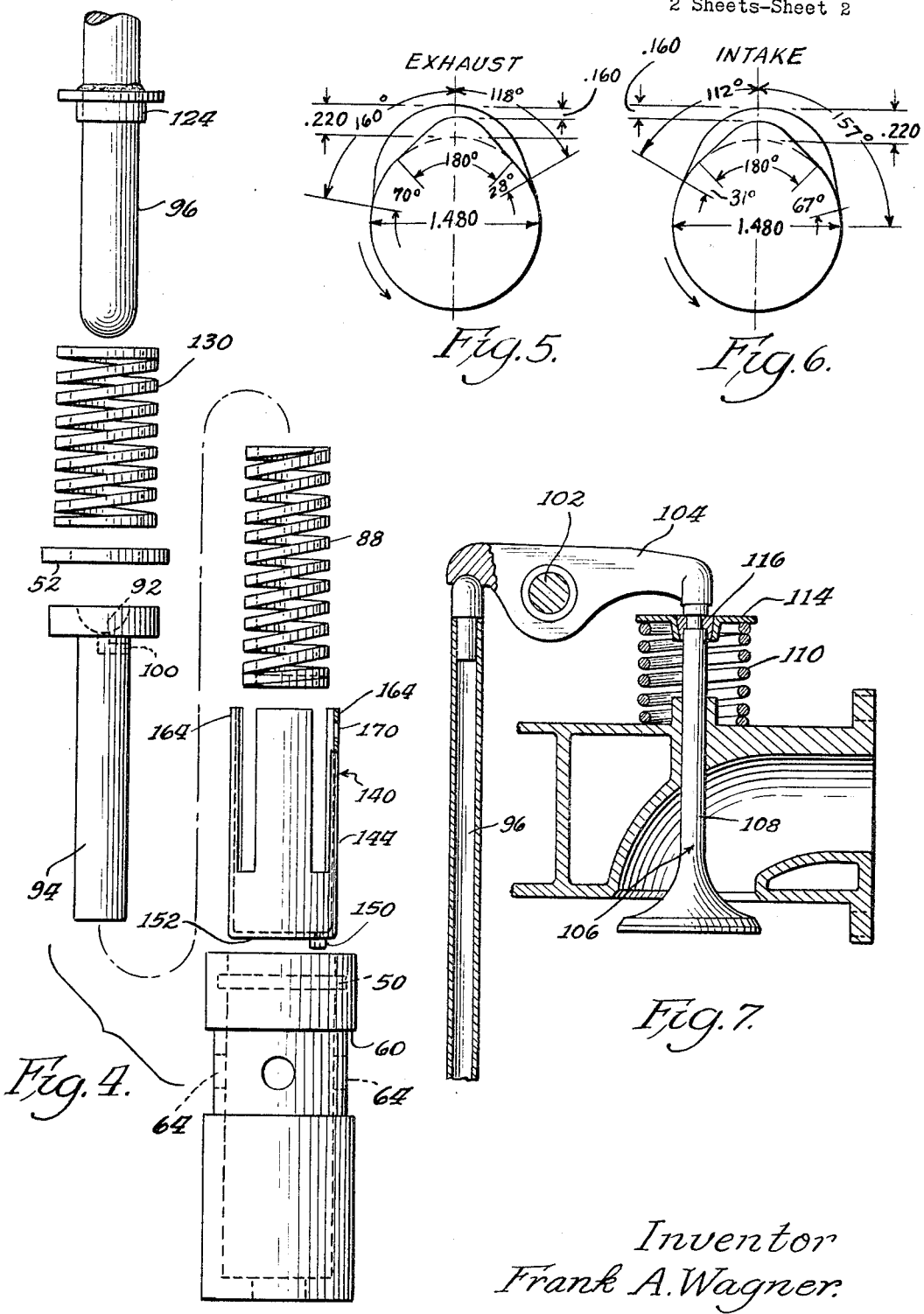

3,277,874
VARIABLE VALVE-TIMING MECHANISM
Frank A. Wagner, Chicago, Ill., assignor to Wagner-Jordan Inc., a corporation of Illinois
Filed Aug. 9, 1965, Ser. No. 478,230
6 Claims. (Cl. 123—90)

This invention relates generally to improvements in variable valve timing mecahnisms finding utility in internal combustion engines. More particularly, the invention is directed to hydraulic mechanisms for operating the exhaust and intake valves of such engines.

It has been long recognized by those skilled in the internal combustion engine art that in such engines, and particularly in four-cycle engines, a fixed valve timing cannot give efficient or economical operation at all engine speeds. For example, an engine designed with high speed timing to give an early opening and late closing of the valves, will produce up to at least ⅓ (one-third) more of maximum power. However, an engine so timed will operate very inefficiently at low speeds. Conversely, an engine designed with low speed timing will operate advantageously at low speeds but will not give efficient performance at high speeds. Thus, it is well known that valve timing is important to the highest running efficiency of an internal combustion engine, and that valve timing specially suited for high engine speeds is not the best timing for low engine speeds. It is therefore, the aim of the present invention to provide a variable valve timing mechanism which will operate automatically to open and close the valves of an internal combustion engine in a manner to ensure maximum operating efficiency of the engine at low speeds, high speeds, and at intermediate speeds.

It is a principal object of the invention to provide a hydraulically controlled variable valve timing mechanism for internal combustion engines which is operative to vary the valve timing to give smooth operation and maximum efficiency over the entire operating speed range of the engine.

Another object of the invention is the provision of a novel multi-lobed cam operative to actuate a multi-lifter element lifter assembly to vary the valve timing during operation of an internal combustion engine to provide maximum efficiency over the complete operating speed range of the engine.

Still another object of the invention is to provide hydraulic coupling means for coupling or interconnecting two lifter elements of a lifter assembly, the degree or extent of coupling being a function of the engine speed.

A related object of the invention is to provide a camming and valve lifter system based upon two different cam contours yet operating under automatically controlled combinations of these contuors, as a function of engine speed.

Yet another object of the invention is to provide an improved automatic variable valve timing mechanism finding utility in both valve-in-head and overhead cam engines.

Another object of the invention is to provide a hydraulically controlled valve timing mechanism having a fluid chamber interposed between telescoping valve lifter elements, and means for controlling oil passage into and from the chamber in accordance with the operating speed of the engine to vary the telescoping action of the lifter elements as a function of engine speed and, thus, to provide optimum valve timing at any given engine speed.

A related object of the invention is to provide a hydraulically controlled variable timing mechanism for valves of internal combustion engines in which increase in engine speed is correlated with fluid coupling of two valve lifter elements, each normally responsive to and in contact with a separate cam lobe.

Other and further objects, aims and advantages of the invention will become apparent from a reading of the following specification taken in conjunction with the drawings in which:

FIGURE 1 is a semi-schematic illustration of mechanisms embodying the invention with parts broken away and in section and illustrating the mechanism with the lifters in position during slow engine speed;

FIGURE 2 is a view of the mechanism of FIGURE 1 taken substantially on the line 2—2 of that figure and illustrating the disposition of the lifters at maximum height of the cam lobe, and having parts broken away and in section;

FIGURE 3 is a sectional view taken substantially on the line 3—3 of FIGURE 1 but showing the lifters in position and engaging the outer lobe of the lifting cam, as at high engine speed;

FIGURE 4 is an exploded view of the component elements of the lifter assembly of the valve timing mechanism of the invention;

FIGURES 5 and 6 are illustrative sector diagrams showing, in reference to different angular positions of the engine or crank, the times of opening and closing of the valves, expressed in degrees pertaining to the valve timing; and FIGURE 7 is a schematic representation of the linkage between a push rod actuated through the mechanism of the invention, and a valve assembly.

The present invention provides an improved system of valve operation and control, the valves and valve actuating elements coacting to attain in a simplified manner optimum valve actuating cycles under a broad range of engine speed.

Although somewhat subordinate to the foregoing general objects and aims of the invention, of objective importance in the preferred embodiment of the invention are improved designs of the valve operating cams, particularly in the shaping or contuoring of the lobes or active profile portions of the cams.

The internal combustion engines in which the variable timing mechanism of the invention finds utility do not broadly as such constitute inventive features or elements of the invention. The invention is generally useful in all types of internal combustion engines including overhead valve type engines and engines in which the valves are located in the block. In addition, the variable valve timing mechanism of the invention may be used with engines in which the valve operating cam shaft is disposed adjacent or over the cylinder head.

For purposes of illustration and illustrative disclosure, the operation of the variable valve timing mechanism of the invention will be described herein with specific reference to an engine having over-head valves, as depicted schematically in FIGURE 7. The engine itself may be considered conventional, including a cylinder block in which cylinders are provided, pistons which are reciprocably received within the cylinder, the cylinder heads being provided with suitable intake and exhaust valves.

The need for providing variable valve timing, particularly in four cycle engines, derives from the fact that a fixed valve timing cycle cannot provide either efficient or economical operation at all engine speeds. Different valve programming is required under differing conditions of engine operation. For example, at slower engine speeds, or at idling speeds, the intake valve should preferably open as the piston reaches top dead center, and should remain open until the piston reaches bottom dead center. Such operation insures full intake of air and fuel mixtures.

At the same time, exhaust valves should not open until the power stroke is completed and the piston reaches bottom dead center. The exhaust valve should then remain open until the piston returns to top dead center, thus completing the cycle.

A completely different valve timing cycle is desirable in engines operating at high speed, so that maximum efficiency and power output are assured. In general, intake valves must open sooner and close later. At high engine speed, the high velocity of air and fuel rushing into the combustion chamber will cause such air and fuel to continue to enter the chamber even after the piston has passed the bottom dead center. At higher engine speeds the exhaust valve is preferably timed to open considerably before the piston reaches the bottom dead center, or prior to completion of the power stroke, and remains open until the piston has passed the top dead center point. In this way, it becomes possible to scavenge the combustion gases from the combustion chamber. In general, the higher the engine speed, the greater is the fraction of the cycle time during which the valves should be retained open.

However, engines timed for high speed operation will not operate satisfactorily at lower speeds. For example, at low engine speeds the opening of the intake valve at a position before top dead center is reached will cause exhaust gases to be discharged through the intake ports. Moreover, as the piston passes bottom dead center, it will push out a portion of the intake mixture, thus reducing the overall effective charge. In a similar manner the premature opening of the exhaust valve robs the engine of a full power stroke, and the overextended open period of the valve reduces the intake charge. An additional objectionable feature is that carbonization of the combustion chamber and the intake valve will occur. Thus, an engine with a predetermined valve timing will give satisfactory performance only within a given speed range.

In a typical low-speed timing cycle there is a relatively small time overlap of the exhaust and intake valves. In contrast, in a timing cycle for high speed engine operation the periods of opening of exhaust valve and of the intake valves are much greater as is the overlap of the open periods of these valves.

It is possible through the present invention to obtain the advantages of both low speed and high speed timing, and of intermediate timing, in a single internal combustion engine, enabling the engine to operate efficiently and at maximum power at both low and high speeds.

The aims and objects of the invention are accomplished by providing in an automatic variable valve timing mechanism a double lobe cam and a double lifter assembly, the lifters being disposed in telescoping relationship and defining therebetween a fluid containing cavity. The rate of oil flow from the cavity is a function of engine speed, at relatively high speed no appreciable quantity of oil is discharged, whereby the two lifters become locked together through the incompressible column of oil in the chamber. In this interlocked position, the high speed cam contour will control the opening and closing of the valves, while at lower speeds, in which the valve lifters are free to move independently, the low speed cam contour will control the opening and the closing of the valves. At intermediate speeds, the effective cam contour will be a composite or hybrid of the shape of the low speed cam and the shape of the high speed cam. Thus, at any given engine speed, optimum conditions of efficiency and power are realized.

Referring more particularly to the drawings, there is shown in FIGURES 1, 2 and 3, for the purpose of illustrative disclosure, a preferred embodiment of the variable valve timing mechanism of the invention, incorporating the teachings thereof. The timing mechanism 10 includes a double lifter assembly 12 and a double lobe cam 14, the latter being fixed on a cam shaft 16 for rotation therewith. The cam 14 is provided with two sets of cam surfaces of differing contours and comprising a low speed lobe 22 and a high speed lobe 24. In the preferred embodiment of the invention illustrated, the low speed lobe 22 is the inner lobe and the high speed lobe is the outer lobe.

The double lifter assembly 12, shown in detail in FIGURES 1 through 3 and depicted in the exploded view, FIGURE 4, is slidably disposed for reciprocating action in a fixed body or block 28. The double lifter assembly 12 includes an outer lifter 32, normally supported on the outer cam load 24, and an inner lifter 34 coaxial with and slidably supported within the outer lifter 32 and normally, or at low speed, controlled by the low speed cam lobe 22.

The outer lifter 32 is generally of a cylindrical or tubular form integrally formed to include an annular base 40 defining an opening 42 through which the lower portion 44 of the inner lifter 34 is slidably received in fluid-tight engagement. Adjacent its upper end the outer lifter 32 is provided with an internal annular groove or recess in which is positioned a ring 52 which serves as an abutment or stop for the inner lifter 34 during its upward travel.

Intermediate its opposed ends, the cylindrical shell or wall 56 of the outer lifter 32 is provided with an annular groove 60 extending radially inwardly from the periphery of the wall 56 as seen most clearly in FIGURE 4. The annularly grooved portion 60 of the lifter shell 56 is provided with annularly spaced openings or ports 64 extending through the wall of the outer lifter 32. In the preferred embodiment of the structure depicted, four ports spaced annularly at 90° from each other are used. As illustrated in FIGURES 2 and 3 the ports 64 communicate with an oil supply and return channel 68 and oil line 70 in the block 28.

In the preferred embodiment of the invention illustrated, and as clearly shown in FIGURES 1 and 4, the inner lifter 34 is generally T-shaped in cross section and includes an elongated shaft portion 74 surmounted by an enlarged transversely extending head portion 76, the head slidably engaging in fluid sealing contact the inner wall surface 80 of the outer lifter 32. As previously described, the lower end of the shaft 74 of the inner lifter extends through the opening 42 in the base 40 of the outer lifter 32. Thus, there is formed between the outer lifter 32 and the inner lifter 34 an annular chamber or cavity 84 adapted to contain and retain hydraulic fluid or oil and in communication with the oil supply and return channels 68 and the oil line 70 through the wall port 64.

Coaxial with the shaft 74 of the inner lifter 34 and disposed circumferentially therearound and in the annular chamber 84 of the lifter asesmbly 12 is a spring 88 supported at its lower end on the annular base 40 of the outer lifter and abutting at its upper end and resiliently urging upwardly the head 76 of the inner lifter 34.

The head 76 of the inner lifter 34 is formed with a socket 92 extending axially inwardly of the top surface 94 of the lifter 76 for receiving in supporting engagement a push rod 96. Lubrication at the rounded base 98 of the push rod 96 is provided through a passage 100 in the head 76 of the inner lifter and communicating with the annular channel 84. As indicated schematically in FIGURE 7, the push rod 96 is connected through conventional linkage, as for example, a rocker pin 102 and rocker arm 104 assembly, to stress against a valve stem 108. During operation of the engine the push rod acts, in the conventional manner, to overcome the pressure of the valve return spring 110 which is retained between a fixed wall 112 and a spring seat 114 keyed 116 on the valve stem 108, to open the valve.

Welded to or otherwise firmly affixed on the push rod 100 is a collar 124, and an auxiliary spring 130 is positioned annularly about the push rod 96. The spring 130 extends between and is confined between the split ring 52 held in the circular groove 50 of the outer lifter and the collar 124. Thus, the springs 88 and 130 act together to oppose the force of the valve return spring 110, greatly reducing the mechanical force necessary to displace the push rod upwardly against the valve return spring 110. It has been found advantageous to select the spring parameters so that the cooperating springs 88 and 130 furnish approximately 80% of the pressure required to displace the push rod 96 against the valve return spring 110.

Positioned within the annular chamber 84 and disposed between the chamber and the openings or ports 64 of the wall 56 of the outer lifter is a check valve 140 which is preferably formed of spring steel, bronze, or the like. As illustrated most clearly in FIGURE 4, the check valve 140 comprises a plurality of flexible bands or metallic sheets 144 extending upwardly from a cup-like base 150. The bottom 152 of the check valve 144 is formed or otherwise provided with a locking key 150 which engages a mating declevity or recess 152 in the base 40 of the outer lifter 32 to preclude rotation of the sleeve-like check valve 140 within the channel 84.

The check valve 140, in the preferred embodiment depicted, includes 4 flexible bands 144 each coinciding radially with and overlying a corresponding port 64 of the shell 56 of the outer lifter 32. In their normal reference positions, the bands 144 block the ports 64, as illustrated in FIGURES 1 and 3. However, upon moving the inner lifter upwardly within the cavity 160 defined by the outer lifter 32, the upper end portions 164 of the bands 144 move radially inwardly to permit additional oil to enter the annular chamber 84. It is readily apparent from a consideration, from the structure illustrated, that downward movement of the inner lifter 34 within the cavity 160 would tend to dispel oil or hydraulic fluid from the annular cavity 84. Such escape or discharge of hydraulic fluid is prevented as the flexible bands 144 overlie and block the ports 64.

In order to permit the discharge of oil from the annular cavity 84 and to permit downward movement of the inner lifter 34 within the outer lifter 32, an exhaust port or orifice 170 is provided in one of the check valve elements or bands 144. This exhaust port is always open and provides fluid communication between the annular chamber 84 of the lifter assembly 12 and the oil line 70 of the internal combustion engine. While in the preferred structural embodiment illustrated, the escape port 170 is provided in only one of the flexible bands 144 of the check valve 140, it is obvious that the equivalent results would be achieved by using smaller holes in all of the bands, if preferred.

The operation of the variable valve timing mechanism shown in the embodiment of FIGURES 1, 2 and 3 is as follows: With the parts positioned as shown in FIGURE 1, and with the inner lifter 34 moving upwardly within the cavity 160, oil under pressure from the oil line 70 will enter the annular cavity 84 of the mechanism through the ports 64 in the outer lifter 32, the bands 144 of the check valve 140 being displaced radially inwardly. As the inner lifter 34 rises through action of the cam lobe 22, the push rod 96 is displaced upwardly to pivot the rocker arm 104 about its pin 102 to unseat the valve 106.

At low engine speed operation, as the internal lifter 34 moves downwardly and follows the radially receding contour of the low speed lobe 22, the downward movement of the head 76 of the inner lifter 34 within the cavity 160 produces fluid pressure within the annular cavity 84 and causes the flexible bands 144 of the check valve 140 to seat across and seal the ports 64. At the same time, hydraulic fluid is discharged from the annular chamber 84 through the orifice 170 (FIGURE 1) in the band 144 of the check valve 140. Thus, at low engine speed, the internal lifter 34 will follow the contour of the low speed cam lobe 22 and, accordingly, the low speed lobe will define the opening and closing cycles of the valve. Moreover, at low engine speed, while the outer lifter 32 rides upon the outer or high speed cam lobe 24, the outer lifter moves independently of the inner lifter 34 and has little or no effect upon the inner lifter and, therefore, upon the push rod 96.

Whereas, at low engine speed operation the inner cam lobe 22 or low speed cam defines the valve opening cycle, at high engine speeds, the outer cam lobe 24 or high speed cam lobe becomes the controlling element in the opening of the valves. The manner in which this is accomplished is set forth below. At high engine speeds, the inner lifter 34 moves upwardly within the cavity 160, in the usual manner. However, at such speeds of annular rotation of the cam shaft 16, as the inner lobe 22 falls away and the inner lifter 34 tends to move downwardly, the rate of oil escape from the annular cavity 84 through the exhaust port 170 becomes a limiting factor in the downward movement of the internal lifter 34, within the outer lifter 32. At sufficiently high engine speeds the internal lifter fails to move downwardly an appreciable distance within the cavity 160 and the internal lifter 34 assumes a position corresponding substantially to its upwardly extreme location, as illustrated in FIGURES 2 and 3. Under these conditions, the fluid medium in the annular cavity 84 becomes a positive coupling or interlock between the inner lifter 34 and the outer lifter 32, and, since the inner lifter is in its upwardly extreme position, the outer lifter 34 becomes the controlling element in determining the opening cycle of the valves.

It will be apparent that the amount of oil forced through the discharge port 170 during the rise of the outer lifter 32 or the relative downward movement of the inner lifter 34 will depend upon the size of the discharge port 170, and hence the quantity of oil discharged from the annular cavity 84 will determine the extent of telescopic action of the inner lifter within the outer lifter. At slowest engine speeds, the telescopic action will be greatest and the inner or low speed cam lobe 22 will control.

As the engine speed is gradually increased, the circulation of hydraulic fluid through the port 170 will progressively decrease. At the same time, there will be a progressive increase in the average height of the column of hydraulic fluid within the annular cavity 84. The outer cam 24 will take over the control of the valve opening, and at top engine speeds, no appreciable oil will be discharged through the exhaust port 170 and there will be insignificant telescopic action between the two lifters 32 and 34. Under these conditions the valve operation will be substantially the same as if the inner and outer lifters were one piece, with their lower surfaces flush, as illustrated schematically in FIGURES 2 and 3. As the outer or high speed cam 34 assumes control, the lifting of the push rod 96 is begun at progessively earlier stages and the push rod 96 will be supported upwardly for increasing fractions of each cycle, thus providing earlier opening and later closing of the valves.

For purposes of illustrative disclosure, and not by way of limitation, preferred cam contours for both the low engine speed cam lobes and the high engine speed cam lobes for both intake and exhaust valve timing are illustrated schematically in FIGURES 5 and 6. Upon consideration of the diagrammatic illustrations, it will be evident that in a typical low-speed timing cycle there is a relatively small overlap between the intake and the exhaust valve. At high speed engine operation, the period of overlap of the exhaust and intake valve is much greater, permitting operation under increased power output and at greater efficiencies. At intermediate speeds, the intake and exhaust valve timing cycle is a composite of the two extremes. Thus in accordance with the practice of the present invention, it is possible to obtain, in a single engine, the advantages of low speed and high speed timing and of intermediate timing ensuring efficient engine operation at maximum speeds, low speeds and at intermediate speed ranges.

Referring more particularly to FIGURE 5 which illustrates the cam control for the exhaust valve, it will be seen that for the high lobe or high engine speed control cam the exhaust valve opens 70° sooner and closes 28° later than for the low speed lobe, the total valve opening at high speed being 278°, based upon the valve timing rather than the cam itself. The low speed cam lobe opens the valve at bottom dead center and permits closure of the valve at top dead center, providing a total opening of 180°.

Referring now to FIGURE 6, the high speed lobe opens the intake valve 31° sooner and permits closure of the intake valve 67° later than the low speed lobe operation. Again, the total valve opening at high speeds is 278°. As in the case of the exhaust valve, the low speed lobe opens the intake valves at top dead center and permits closure 180° later at bottom dead center.

While a preferred commercial embodiment of the novel variable valve timing mechanism of the invention has been illustrated and described, it is understood that the same is capable of modification and that such modifications may be made without departure from the spirit and scope of the invention as defined in the appended claims.

What is claimed is:

1. In a cam-actuated mechanism for opening valves of an internal combustion engine,
   a cam having a first and a second set of cam surfaces comprising an outer lobe and an inner lobe of said cam,
   a fixed body,
   a pair of fluid-coupled lifters disposed to abut respectively said outer and inner lobes of said cam and arranged within said body in coaxial sliding engagement and having portions disposed for relative telescoping movement,
   one of said lifters engaging a push rod for opening a valve of an engine,
   said lifters defining therebetween an annular chamber adapted to contain a body of liquid comprising fluid means coupling one of said lifters to the other,
   the degree of coupling between said lifters being a function of linear displacement velocity of said lifters in response to cam action thereagainst,
   inlet conduit means communicating with said annular chamber for introducing liquid into said chamber,
   and porting means for controlling the rate of escape of fluid from said chamber during axial displacement of said lifters relative to one another, and thereby determining the degree of fluid coupling of said lifters to one another.

2. A cam-actuated valve mechanism for actuating intake and exhaust valves of an internal combustion engine, comprising:
   a cam having a first and a second set of cam surfaces comprising an outer lobe and an inner lobe of said cam,
   first and second fluid-coupled axially-reciprocable and relatively movable coaxial outer and inner lifters disposed to abut respectively said outer and said inner lobe of said cam,
   said inner lifter engaging a push rod for opening a valve of an engine,
   said lifters defining therebetween an annular chamber of variable volume and adapted to retain a hydraulic medium for fluid coupling of said outer and inner lifters,
   a wall of said outer lifter having through inlet means for introduction of fluid into said chamber and having a fluid escape port for controlling fluid discharge from said chamber,
   fluid conduit means communicating with said fluid inlet means and said fluid escape port for providing a supply of hydraulic fluid to said annular chamber,
   check valve means permitting inflow of hydraulic fluid to said chamber through said inlet means and preventing flow of fluid from said chamber through said inlet means,
   said fluid escape port comprising orifice means for regulating exhaust of fluid from said annular chamber during movement of said inner lifter downwardly with respect to said outer lifter.

3. In a cam operated mechanism for actuating the valve of an engine,
   a fixed body,
   a lifter assembly in reciprocably slidable engagement with said fixed body and including a pair of coaxial inner and outer lifting elements arranged in telescoping relation with one another,
   an enlarged head portion of said inner lifting element having an upstanding peripheral lateral wall engaging in contiguous and fluid sealing contact a parallel vertically extending inner lateral wall of said outer lifting element,
   said head portion engaging a push rod for opening the valve of an engine,
   said inner lifting element including a shaft connected to said head portion, said shaft being of a reduced transverse dimension as compared with said head portion and projecting downwardly through a transversely extending base wall of said outer lifting element in fluid sealing sliding engagement therewith for reciprocation therethrough and for opening said valve of said engine in response to cam pressure applied axially to said shaft at a base thereof,
   said shaft and said outer lifting element defining therebetween an annular chamber adapted to contain a body of liquid through which thrust of a cam against the outer lifter is transmitted to the inner lifter at increased speeds of said engine,
   fluid inlet means for introducing liquid into said chamber,
   said liquid constituting a variable fluid coupling between said inner and outer lifting elements,
   fluid discharge means for controlling discharge of liquid from said chamber such that the degree of coupling and coaction between said lifting elements is correlated with an increase in engine speed, with associated increase in velocity of reciprocating movement of said lifter assembly in said fixed body upon increase in engine speed, and with concurrent detention of fluid in said annular chamber;
   whereby said inner and outer lifter elements approach complete coordination of movement as said engine speed increases.

4. The mechanism of claim 3 and further comprising a coil spring confined in said annular chamber and annularly disposed about said shaft of said inner lifter element,
   said spring resiliently abutting at its opposed ends said head portion of said inner lifter element and said base wall of said outer lifting element to oppose downward movement of said inner lifting element and to provide support for said push rod engaged by said inner lifting element.

5. The mechanism of claim 4 and further comprising:
   an annular collar keyed to said push rod against relative axial displacement,
   spring means annularly disposed about said push rod upwardly of said lifter assembly and extending between said collar and said outer lifting element to urge said push rod resiliently upward from said lifter assembly to oppose valve spring pressure and to reduce said pressure transmitted through said push rod to said inner lifting element.

6. In a valve control assembly for opening exhaust and intake valves of an internal combustion engine,
   a cam shaft having a valve-actuating double lobe cam,
   a pair of valve lifters comprising cam followers engaging respective lobes of said cam, and a push rod engaging one of said lifters and displayed by said cam through action of said lifters to open a valve of said engine, said valve lifters comprising a first element of generally tubular configuration and having a transversely extending base wall, and a second element coaxial with and extending within said first element, said second element being of a generally T-shaped cross-section and having an enlarged head portion and a shaft portion depending therefrom, said head portion being slidable within said first element in fluid sealing engagement thereagainst, and said shaft portion extending through an opening in said base wall of said first element in fluid sealing engagement against surfaces defining said opening, said valve lifters defining therebetween an annular chamber adapted to retain a fluid for controlled automatic variable coupling of said lifters during operation thereof, conduit means and check valve means for supplying fluid to said chamber, and restricted porting means communicating with said chamber for exhausting of fluid therefrom, said restricted porting means providing a volume rate escape of oil from said chamber through said porting means during cam action against said lifters varying inversely as the angular velocity of said cam shaft and double lobe cam during operation of said engine, input to and exhaust of oil from said chamber at slow engine speed permitting substantially independent linear displacement of said lifters in response to cam lobe pressures applied thereagainst to constitute said second element and its associated cam lobe as means for controlling displacement of said push rod, whereas at higher engine speeds time lag and oil discharge from said chamber prevents said lifters from independently following respective said cam lobes, thereby effecting a degree of fluid coupling engagement and interlocking between said lifters, said degree of engagement and interlocking being proportional to and increasing with engine speed;

whereby said first element and its associated cam lobe assume an increasing degree of control over axial displacement patterns of said push rod and over control of valve openings as engine speeds increase.

References Cited by the Examiner

UNITED STATES PATENTS

| | | | |
|---|---|---|---|
| 2,010,167 | 8/1935 | Tibbetts | 123—90 |
| 2,019,444 | 10/1935 | Church | 123—90 |
| 2,308,858 | 1/1943 | Burkhardt | 123—90 |
| 2,309,740 | 2/1943 | Voorhies | 123—90 |
| 2,484,109 | 10/1949 | Meinecke | 123—90 |
| 2,614,547 | 10/1952 | Meinecke | 123—90 |
| 2,668,524 | 2/1954 | Randol | 123—90 |

FOREIGN PATENTS 218,893  11/1958  Australia.

MARK NEWMAN, *Primary Examiner.*

A. L. SMITH, *Assistant Examiner.*

UNITED STATES PATENT OFFICE
CERTIFICATE OF CORRECTION

Patent No. 3,277,874                              October 11, 1966

Frank A. Wagner

It is hereby certified that error appears in the above numbered patent requiring correction and that the said Letters Patent should read as corrected below.

Column 1, line 8, for "mecahnisms" read -- mechanisms --; line 54, for "contuors" read -- contours --; column 2, line 40, for "contuoring" read -- contouring --; column 9, line 1, for "displayed" read -- displaced --.

Signed and sealed this 12th day of September 1967.

(SEAL)
Attest:

ERNEST W. SWIDER                           EDWARD J. BRENNER
Attesting Officer                               Commissioner of Patents